(12) United States Patent
Merriman et al.

(10) Patent No.: US 7,039,599 B2
(45) Date of Patent: May 2, 2006

(54) METHOD AND APPARATUS FOR AUTOMATIC PLACEMENT OF ADVERTISING

(75) Inventors: Dwight A Merriman, New York, NY (US); Kevin O'Connor, New York, NY (US)

(73) Assignee: Doubleclick Inc., New York, NY (US)

( * ) Notice: Subject to any disclaimer, the term of this patent is extended or adjusted under 35 U.S.C. 154(b) by 922 days.

(21) Appl. No.: 09/094,949

(22) Filed: Jun. 15, 1998

(65) Prior Publication Data

US 2002/0099600 A1 Jul. 25, 2002

Related U.S. Application Data

(60) Provisional application No. 60/048,940, filed on Jun. 16, 1997, and provisional application No. 60/049,877, filed on Jun. 17, 1997.

(51) Int. Cl.
*G06F 17/60* (2006.01)

(52) U.S. Cl. ....................................................... 705/14
(58) Field of Classification Search ................... 705/14; 709/219; 707/501
See application file for complete search history.

(56) References Cited

U.S. PATENT DOCUMENTS

| | | | |
|---|---|---|---|
| 4,602,279 A | 7/1986 | Freeman | |
| 4,703,423 A | 10/1987 | Bado et al. | |
| 4,775,935 A | 10/1988 | Yourick | |
| 4,789,235 A | 12/1988 | Borah et al. | |

(Continued)

FOREIGN PATENT DOCUMENTS

| | | |
|---|---|---|
| DE | 19528911 A1 | 2/1997 |
| EP | 0 216 535 A2 | 4/1987 |
| EP | 0 216 535 A3 | 4/1987 |
| EP | 0 355 697 B1 | 2/1990 |

(Continued)

OTHER PUBLICATIONS

Bill Harvey, The Expanded ARF Model: Bridge to the Accountable Advertising Future, Journal of Advertising Research, Mar./Apr. 1997, pp. 11–20.*

Cespedes & Smith, Database Marketing: New Rules for Policy and Practice, Sloan Management Review, Summer, 1993, pp. 7–22.*

Webster's Third New International Dictionary of the English Language Unabridged, 1967, p. 2171.*

(Continued)

*Primary Examiner*—Lynda C Jasmin
*Assistant Examiner*—Ronald Laneau
(74) *Attorney, Agent, or Firm*—Kenyon & Kenyon

(57) ABSTRACT

A computer system for automatic replacement of direct advertisements in scarce media includes an advertising server for selecting a direct advertisement based on certain criteria. Transaction results of the direct advertisement placement are reported back to the advertising server, and an associated accounting system. In one embodiment, the direct advertiser's server reports transactions back to the advertising server by email. In a second embodiment, a direct proxy server brokers the user's session (or interaction) with the direct advertiser's server, including transaction processing and the direct proxy server reports the results of transactions back to the advertising server and its associated accounting system. A direct proxy provides an independent audit of transactions at a remote direct advertiser's web site. The feedback of the results of direct advertisement transactions provides an efficient utilization of direct advertising space by way of an automated computer system with a predictive model for selection and distribution of direct advertising.

15 Claims, 5 Drawing Sheets

U.S. PATENT DOCUMENTS

| | | |
|---|---|---|
| 4,850,007 A | 7/1989 | Marino et al. |
| 4,870,579 A | 9/1989 | Hey |
| 4,996,642 A | 2/1991 | Hey |
| 5,027,400 A | 6/1991 | Baji et al. |
| 5,099,422 A | 3/1992 | Foresman et al. |
| 5,105,184 A | 4/1992 | Pirani et al. |
| 5,155,591 A | 10/1992 | Wachob |
| 5,166,866 A | 11/1992 | Kim et al. |
| 5,191,410 A | 3/1993 | McCalley et al. |
| 5,220,501 A | 6/1993 | Lawlor et al. |
| 5,253,341 A | 10/1993 | Rozmanith et al. |
| 5,260,778 A | 11/1993 | Kauffman et al. |
| 5,261,094 A | 11/1993 | Everson et al. |
| 5,283,731 A | 2/1994 | Lalonde et al. |
| 5,305,195 A | 4/1994 | Murphy |
| 5,347,632 A | 9/1994 | Filepp et al. |
| 5,355,327 A | 10/1994 | Stent et al. |
| 5,361,393 A | 11/1994 | Rossillo |
| 5,377,354 A | 12/1994 | Scannell et al. |
| 5,412,416 A | 5/1995 | Nemirofsky |
| 5,442,771 A | 8/1995 | Filepp et al. |
| 5,446,891 A | 8/1995 | Kaplan et al. |
| 5,446,919 A | 8/1995 | Wilkins |
| 5,448,625 A | 9/1995 | Lederman |
| 5,459,656 A | 10/1995 | Fields et al. |
| 5,469,206 A | 11/1995 | Strubbe et al. |
| 5,475,819 A | 12/1995 | Miller et al. |
| 5,477,451 A | 12/1995 | Brown et al. |
| 5,499,046 A | 3/1996 | Schiller et al. |
| 5,504,744 A | 4/1996 | Adams et al. |
| 5,504,894 A | 4/1996 | Ferguson et al. |
| 5,515,098 A | 5/1996 | Carles |
| 5,515,270 A | 5/1996 | Weinblatt |
| 5,537,542 A | 7/1996 | Eilert et al. |
| 5,550,746 A | 8/1996 | Jacobs |
| 5,559,548 A | 9/1996 | Davis et al. |
| 5,566,353 A | 10/1996 | Cho et al. |
| 5,568,612 A | 10/1996 | Barrett et al. |
| 5,572,643 A | 11/1996 | Judson |
| 5,584,025 A | 12/1996 | Keithley et al. |
| 5,594,910 A | 1/1997 | Filepp et al. |
| 5,598,536 A | 1/1997 | Slaughter, III et al. |
| 5,600,364 A | 2/1997 | Hendricks et al. |
| 5,621,812 A | 4/1997 | Deaton et al. |
| 5,636,346 A | 6/1997 | Saxe |
| 5,638,457 A | 6/1997 | Deaton et al. |
| 5,649,114 A | 7/1997 | Deaton et al. |
| 5,675,662 A | 10/1997 | Deaton et al. |
| 5,692,132 A | 11/1997 | Hogan .................... 395/227 |
| 5,704,017 A | 12/1997 | Heckerman et al. |
| 5,704,018 A | 12/1997 | Heckerman et al. |
| 5,708,780 A * | 1/1998 | Levergood et al. .... 395/200.12 |
| 5,710,887 A | 1/1998 | Chelliah et al. ............ 395/226 |
| 5,712,979 A | 1/1998 | Graber et al. .......... 395/200.11 |
| 5,717,860 A | 2/1998 | Graber et al. .......... 395/200.12 |
| 5,717,923 A | 2/1998 | Dedrick |
| 5,721,827 A | 2/1998 | Logan et al. .......... 395/200.47 |
| 5,724,424 A | 3/1998 | Gifford ........................ 380/24 |
| 5,724,521 A | 3/1998 | Dedrick |
| 5,727,156 A | 3/1998 | Herr-Hoyman et al. .................... 395/200.49 |
| 5,734,720 A | 3/1998 | Salganicoff |
| 5,734,828 A | 3/1998 | Pendse et al. |
| 5,737,619 A | 4/1998 | Judson .................... 395/761 |
| 5,740,252 A * | 4/1998 | Minor et al. .................... 380/49 |
| 5,740,549 A | 4/1998 | Reilly et al. .................... 705/14 |
| 5,745,681 A | 4/1998 | Levine et al. |
| 5,751,956 A | 5/1998 | Kirsch .................... 395/200.33 |
| 5,752,022 A | 5/1998 | Chiu et al. |
| 5,754,772 A * | 5/1998 | Leaf ...................... 395/200.33 |
| 5,754,938 A | 5/1998 | Herz et al. |
| 5,754,939 A | 5/1998 | Herz et al. |
| 5,757,917 A | 5/1998 | Rose et al. .................... 380/25 |
| 5,761,601 A | 6/1998 | Nemirofsky et al. |
| 5,768,521 A | 6/1998 | Dedrick |
| 5,774,170 A | 6/1998 | Hite et al. |
| 5,778,367 A | 7/1998 | Wesinger, Jr. et al. |
| 5,781,894 A | 7/1998 | Petrecca et al. |
| 5,787,253 A | 7/1998 | McCreery et al. |
| 5,790,426 A | 8/1998 | Robinson |
| 5,790,935 A | 8/1998 | Payton |
| 5,794,210 A | 8/1998 | Goldhaber et al. |
| 5,796,945 A | 8/1998 | Tarabella |
| 5,796,952 A | 8/1998 | Davis et al. |
| 5,809,242 A | 9/1998 | Shaw et al. |
| 5,812,769 A | 9/1998 | Graber et al. |
| 5,812,776 A | 9/1998 | Gifford |
| 5,815,148 A | 9/1998 | Tanaka |
| 5,819,285 A | 10/1998 | Damico et al. |
| 5,838,790 A | 11/1998 | McAuliffe et al. |
| 5,842,199 A | 11/1998 | Miller et al. |
| 5,848,396 A | 12/1998 | Gerace |
| 5,848,397 A * | 12/1998 | Marsh et al. .................. 705/14 |
| 5,855,008 A | 12/1998 | Goldhaber et al. |
| 5,870,724 A | 2/1999 | Lawlor et al. |
| 5,873,068 A | 2/1999 | Beaumont et al. |
| 5,893,075 A | 4/1999 | Plainfield et al. |
| 5,913,040 A * | 6/1999 | Rakavy et al. ......... 395/200.62 |
| 5,918,014 A | 6/1999 | Robinson |
| 5,933,811 A * | 8/1999 | Angeles et al. ............... 705/14 |
| 5,933,827 A | 8/1999 | Cole et al. |
| 5,937,392 A | 8/1999 | Alberts |
| 5,946,646 A | 8/1999 | Schena et al. |
| 5,948,061 A | 9/1999 | Merriman et al. |
| 5,950,173 A | 9/1999 | Perkowski |
| 5,956,024 A | 9/1999 | Strickland et al. |
| 5,960,409 A * | 9/1999 | Wexler ....................... 705/14 |
| 5,960,429 A | 9/1999 | Peercy et al. |
| 5,990,927 A | 11/1999 | Hendricks et al. |
| 5,999,912 A | 12/1999 | Wodarz et al. |
| 6,002,393 A | 12/1999 | Hite et al. |
| 6,005,566 A | 12/1999 | Jones et al. |
| 6,005,567 A | 12/1999 | Nielsen |
| 6,006,252 A | 12/1999 | Wolfe |
| 6,016,509 A | 1/2000 | Dedrick |
| 6,020,887 A | 2/2000 | Loring et al. |
| 6,026,368 A | 2/2000 | Brown et al. |
| 6,029,195 A | 2/2000 | Herz |
| 6,049,777 A | 4/2000 | Sheena et al. |
| 6,049,878 A | 4/2000 | Caronni et al. |
| 6,052,554 A | 4/2000 | Hendricks et al. |
| 6,061,659 A | 5/2000 | Murray |
| 6,119,101 A | 9/2000 | Peckover |
| 6,185,586 B1 | 2/2001 | Judson |
| 6,718,551 B1 | 4/2004 | Swix et al. |
| 6,757,662 B1 | 6/2004 | Greenwald et al. |
| 2002/0013785 A1 | 1/2002 | Miyazaki et al. |
| 2002/0019831 A1 | 2/2002 | Wade |
| 2002/0046118 A1 | 4/2002 | Minte |
| 2002/0082923 A1 * | 6/2002 | Merriman et al. ............ 705/14 |
| 2002/0099600 A1 | 7/2002 | Merriman et al. |
| 2002/0103698 A1 | 8/2002 | Cantrell |
| 2003/0023489 A1 | 1/2003 | McGuire et al. |

FOREIGN PATENT DOCUMENTS

| | | |
|---|---|---|
| EP | 0 355 697 A2 | 2/1990 |
| EP | 0 355 697 A3 | 2/1990 |
| EP | 0 643 359 A3 | 3/1995 |
| EP | 0 643 359 A2 | 3/1995 |
| EP | 0 749 081 A | 12/1996 |
| EP | 0 875 843 A1 | 11/1997 |

| | | | |
|---|---|---|---|
| EP | 0 814 419 A2 | 12/1997 |
| EP | 0 818 742 A1 | 1/1998 |
| EP | 0 834 822 A2 | 4/1998 |
| EP | 0 834 822 A3 | 4/1998 |
| EP | 0 837 407 A1 | 4/1998 |
| EP | 0 838 769 A2 | 4/1998 |
| EP | 0 849 689 A3 | 6/1998 |
| EP | 0 849 689 A2 | 6/1998 |
| EP | 0 864 990 A2 | 9/1998 |
| EP | 0 864 990 A3 | 9/1998 |
| EP | 0 869 448 A1 | 10/1998 |
| EP | 0 749 081 B1 | 11/1998 |
| EP | 0 877 314 A1 | 11/1998 |
| EP | 0 897 158 A1 | 2/1999 |
| EP | 0 897 158 A4 | 2/1999 |
| JP | H5143653 A | 6/1993 |
| JP | 9091215 | 4/1997 |
| JP | 10049591 A | 2/1998 |
| WO | WO 84/01382 A1 | 4/1984 |
| WO | WO 84/01382 B1 | 10/1984 |
| WO | WO 84/01382 A4 | 10/1984 |
| WO | WO 93/16443 A1 | 8/1993 |
| WO | WO 93/19427 A1 | 9/1993 |
| WO | WO 94/23383 A1 | 10/1994 |
| WO | WO 95/12176 A4 | 5/1995 |
| WO | WO 95/12176 A3 | 5/1995 |
| WO | WO 95/12176 A2 | 5/1995 |
| WO | WO 95/13587 A1 | 5/1995 |
| WO | WO 95/16971 A1 | 6/1995 |
| WO | WO 95/16971 A4 | 6/1995 |
| WO | WO 96/31848 A2 | 9/1996 |
| WO | WO 96/31848 A3 | 9/1996 |
| WO | WO 96/30864 A1 | 10/1996 |
| WO | WO 96/36926 A1 | 11/1996 |
| WO | WO 96/38796 A1 | 12/1996 |
| WO | WO 96/39668 A1 | 12/1996 |
| WO | WO 97/07656 A2 | 3/1997 |
| WO | WO 97/07656 A3 | 3/1997 |
| WO | WO 97 21183 A | 6/1997 |
| WO | WO 97/41673 A3 | 11/1997 |
| WO | WO 97/41673 A2 | 11/1997 |
| WO | WO 96/38796 B1 | 3/1998 |
| WO | WO 98/34189 A1 | 9/1998 |
| WO | WO 98/57275 A3 | 12/1998 |
| WO | WO 98/57275 A2 | 12/1998 |
| WO | WO 01/65747 A1 * | 9/2001 |

OTHER PUBLICATIONS

Microsoft Press Computer Dictionary Third Edition, 1997, p. 387.*
Draft HTML 2.0 Specification, Sep. 22, 1995.*
Booker, Ellis "Seeing a Gap, A Palo Alto Startup Will Debut Advertising Server for the Net", Web Week, v.2 iss2. Availabe online at http://www.interntworld.com, Feb. 1996.*
Metcalfe, Bob "From the Ether", InfoWorld, v. 18 iss 3. Available at http://www.infoworld.com, Aug. 1996.*
NetGravity AdServer 2.0 Annoucement. Available at http://www.netgravity.com, Oct. 1996.*
"Internet access: Internet marketing revolution begins in the US this September" (Hyper Net offering), EDGE: Work-Group Computing Report, v7 n316, Jun. 1996.*
Kohda Y et al; Ubiquitous advertising on the WWW: Merging Advertise? on the Browser, Computer Networks and ISDN Systems, vol. 28, No. 11, May 1996, pp. 1493–1499.
17625888; Java and Blackbird: extending the Web . . . ; Seybold Reoport on Publishing Systems; Oct. 23, 1995.
17497026; Look who's surfing . . . ; Schurr; PC Week; Oct. 30, 1995.
17594025; HotWired and Neilsem team to verify usage data; Electronic Marketplace Report; Jul. 4, 1995.
17225819; Write once, publish many times; Ratcliffe: Digital Media: Aug. 7, 1995.
17189959; Product View seeks funding for 3Q launch of ad–supported . . . ; Electronic Marketplace Report; May 16, 1995.
17244186; Free E–Mail with Postage Stamp "Ads"; Newsbytes; Jul. 3, 1995.
CWK19951009S0006; Search–engine advertising; Frook; Communications Week; Nov. 9, 1995.
www5conf.inria.fr; Ubiquitous Advertising on the WWW: Kohda et al; Fifth International WWW Conference; May 6–10, 1996.
Bounty Quest home page article title DoubleClick Bounty Paid Ad Pioneer Turned Online Porn Mogul Wins $10,000; (<http://www.bountyquest.com/>; printed on Mar. 9, 2001).
Bounty Quest Web page displaying article titled Bounty Collected Double Click Banner Ad Patent; (http://www.bountyquest.com/bounties/displayBounty.php?bountyName=1019; printed on Mar. 9, 2001).
Bounty Quest Web page displaying article titled Digital Porn Mogul Wins Silver Bullet Award; (http://www.bountyquest.com/winner/bschuster.htm; printed on Mar. 9, 2001).
Business Plan posted on Bounty Quest Website titled Summary of Proposed Business Activities for the World Wide Internet Network (WWIN); (http://www.bountyquest.com/images/doubleclickPage9.gif, printed on Mar. 9, 2001).
Business Plan posted on Bounty Quest Website titled Summary of Proposed Business Activities for the World Wide Internet Network (WWIN); (http://www.bountyquest.com/images/doubleclickPage9.gif, printed on Mar. 9, 2001).
Sales Literature posted on Bounty Quest Website titled What You Get with WWIN; (http://bountyquest.com/images/doubleclickGet.gif, printed on Mar. 9, 2001).
CNET Press Release titled About CNET; (http://www.canada.cnet.com/aboutcnet/0–13613–7–808022.html; printed on Mar. 9, 2001).
Cashing in: The rush is on to buy and sell on the Internet, Interactive Media & Marketing, Adv. Age, p. 11, Dec. 19, 1994.
Improved Internet security enabling . . . , PC Week, v12, n11, p1(2), Mar. 20, 1995.
"MediaLink: Bell Laboratories unveils sophisticated information insertion technology for broadcast and cable advertising," EDGE, v11, p43(1), Dec. 16, 1996.
"Infoseek Offers Web Advertisers Customized Delivery of Ads," Newsbytes, pNEW05270111, May 27, 1997.
Blankenhorn, Dana; "Sites experiment with advertising to offer free service," Advertising Age's Business Marketing, v82, p29, Jul. 1997.
Lockard, Meredith; "Advertising done your way," Target Marketing, v20, n10, p40, ISSN: 0889–5333, Oct. 1997.
"Ericsson Introduces New Intelligent Network–Based Internet Advertiser At Internet World '98," Business Wire, p0240, Oct. 7, 1998.
Chat Transcript; Topic: Ad Measurement and Management; Oct. 15, 1998; (http:///www.zeff.com/learn/zdu/advertising/zinman.html; printed on Feb. 7, 2000.
CNET Press Release titled "CNET Online Signs Up More Than a Quarter of a Million Members Through Voluntary Registration after Only Five Months"; (http://home.cnet.com/aboutcnet/0–13613–7–808021.html; printed on Nov. 26, 1999).

Preston Gralla, How the Internet Works, Aug. 1999, Millennium Edition, 202–204 and 243–247.

Miller, B., "GroupLens: An Open Architecture for Collaborative Filtering," ftp://ftp.cs.umn.edu/users/bmiller/prop.ps, Univ. of Minn., pp. 1–18, Oct. 1995.

Upendra Shardanand, "Social Information Filtering for Music Recommendation" Sep. 1994, pp. 1–93, Massachusetts Institute of Technology, Thesis.

"WWW.barnesandnoble.com" ("WWW.firefly.com"), web site pages, 12 pages, printed out on Jan. 21, 1998, origination date unknown.

"WWW.amazon.com", web site pages, 15, pages, printed out on Jan. 21, 1998, Origination date unknown.

Microsoft Press Computer Dictionary Third Edition, 1997, pp. 271 ("junction") , 285 ("link"), 331 ("node").

51st IETF—Whois enhancement BOF (Whoisfix), Aug. 1, 2001.

Doubleclick Measures Beyond the Click with New "Spotlight" Software, Sep. 4, 1996, Doubleclick.

Doubleclick Unveils Internet Ad Tracking Product, Sep. 4, 1996, Reuter Financial Report.

Doubleclick Shines Its Spotlight, Sep. 5, 1996, Advertising Age—Interactive Daily.

Spotlight on Doubleclick, Sep. 13, 1996, Information & Interactive Services Report.

Tracking Services Tallies Ad Response, Online Orders, Sep. 16, 1996, DMNews.

Luring in Customers Via Web Advertising, Oct. 1996, Business Strategies.

David E. Zinman (founder of FocaLink), Deposition Transcript from *Doubleclick, Inc. v. L90, Inc.*, 00 Civ. 2690, S.D.N.Y.

Ronald A. Kovas (CEO of FocaLink), Deposition Transcript from *Doubleclick, Inc. v. L90, Inc.*, 00 Civ. 2690, S.D.N.Y.

LinkMarket Business Plan; David Zinman et al.; SD005545–SD005569.

LinkMarket; David Zinman et al.; SD005573–SD005574.

"Online Marketing: . . . "; Internet Week, vol. 1, Issue 36; Dec. 18, 1995; SD005584–SD005595.

David Zinman; http://www.focalink.com/dzinman/bio.html; SD005586.

"Seeing A Gap . . . "; Ellis Booker; http://www.internetworld.com/print/1996/02/01/industry/ad–server.html; Feb., 1996; SD005587.

"readme. 1st; . . . "; David Evans; Marketing Computers, No. 2, vol. 16, p. 12; Feb. 1996; SD005588–SD005589.

"FocaLink Will Monitor . . . "; Julia Angwin; San Francisco Chronicle; Feb. 7, 1996; SD005590.

"Media Daily Special: . . . "; Sean Butterbaugh; Media Daily, No. 5, vol. 4; Feb. 7, 1996; SD005591–SD005592.

"Internet Access: Major Companies . . . "; Edge: Work–Group Computing Report; Feb. 12, 1996; SD005593–SD005594.

"Internet Access: First Advertising . . . "; Edge: Work–Group Computing Report; Feb. 12, 1996; SD005595–SD005596.

"Internet Access: Major Companies . . . "; Edge: Work–Group Computing Report; Feb. 12, 1996; SD005597–SD005598.

"Another Media–Buying Firm . . . "; Media Daily, No. 5, vol. 4; Feb. 14, 1998; SD005599–SD005601.

"Working the Web; . . . "; Jennifer Reese; Executive Female, No. 2, vol. 19, p. 24; Mar. 13, 1996; SD005602–SD005604.

"Web ad–management software . . . "; John Evan Frook; InternetWeek; Mar. 18, 1996; SD005605–SD005607.

"Unraveling a tangled Web; . . . "; Ken Siegmann; PC Week, No. 15, vol. 13, p. A4; Apr. 15, 1996; SD005608–SD005610.

"Web Site Links; . . . "; Electronic Marketplace Report, No. 16, vol. 9; Aug. 22, 1995; SD005611–SD005613.

"Interactive Media & Marketing . . . "; Advertising Age; Dec. 11, 1995; SD005614–SD005615.

"Major Companies, Ad Agencies . . . "; Business Wire; Feb. 5, 1996; SD005616–SD005617.

"First Advertising Server Launched . . . "; Business Wire; Feb. 5, 1996; SD005618–SD005619.

"Interactive; FocaLink and Doubleclick . . . "; Kim Cleland; Advertising Age, p. 30; Feb. 5, 1996; SD005620–SD005621.

"First Advertising Server Launched . . . "; Business Wire; Feb. 5, 1996; SD005622–SD005623.

"Major Companies, Ad Agencies . . . "; Business Wire; Feb. 5, 1996; SD005624–SD005625.

Web Personals Report; Oct. 12, 1995; Z00001–Z00009/SD027072–SD027080.

FocalLink Technology; Aug. 30, 1995; Z00010–Z00011/SD027081–SD027082.

Web Personals stats; Aug. 22, 1995; Z00012–Z00013/SD027083–SD027084.

For Immediate Release; Hyperlink Advertising Explodes on the World Wide Web; http://link.w3.com; Z00014/SD027085.

Interactive Age; The Newspaper for Electronic Commerce; Z00015–Z0019/SD027086–SD027090.

Link Marketing, LLP; Z00020–Z00021/SD027091–SD027092.

Link Marketing; Z00022–Z00027/SD027093–SD027098.

Link Marketing; David Zinman et al.; Z00028–Z00030/SD027099–SD027101.

Link Market; David Zinman et al.; Z00031–Z00032/SD027102–SD027103.

Link Market; David Zinman et al.; Z00033–Z00056/SD027104–SD027127.

FocalLink Media Services, Inc.; David Zinman et al.; Aug. 2, 1995; Z00057–Z00070/SD027128–SD027141.

Saturn Banner Ad Placement; Aug. 25, 1995; Z00071/SD027142.

Sponsorable Site—Riddle Du Jour; Aug. 26, 1995; Z00072–Z00074/SD027143–SD027145.

Saturn Banner Ad Placement; Aug. 27, 1995; Z00075/SD027146.

FocalLink Technology; Aug. 30, 1995; Z00076–Z00077/SD027147–SD027148.

Question for you; Sep. 7, 1995; Z00078–Z00079/SD027149–SD027150.

Information Request; Sep. 12, 1995; Z00080/SD027151.

Udate and Miscellaneous; Sep. 22, 1995; Z00081–Z00083/SD027152/SD027154.

FocalLink: request for ISN an traffic data (fwd); Sep. 26, 1995; Z00084–Z00085/SD027155–SD027156.

Saturn Ad Placements; Sep. 28, 1995; David Zinman; Z00086/SD027157.

RE>Saturn Ad Placements; Sep. 29, 1995; Adam @utne.co; Z00087/SD027158.

RE: Advertising Update; Oct. 3, 1995; Eric Ver Ploeg; Z00088–Z00089/SD027159–SD027160.

RE>>Saturn Ad Placements; Sep. 29, 1995; wigley@utne.com; Z00090/SD027161.

Re: Test Parameters (fwd); Oct. 23, 1995; Jason Strober; Z00091–Z00092/SD027162–SD027163.
Re: Rest Parameters; Oct. 23, 1995; Jason Strober; Z00093–Z00094/SD027164–SD027165.
Proposal (fwd); Oct. 23, 1995; Jason Strober; Z00095–Z00096/SD027166–SD027167.
Advertising advisory board; Oct. 25, 1995; David Zinman; Z00097–Z00099/SD027168–SD027170.
Contact at Netcom; Oct. 26, 1995; David Zinman; Z00100/SD027171.
CMP Technical Contact; Oct. 30, 1995; Jason Strober; Z00104/SD027172.
from ad age today . . . ; Oct. 30, 1995; Karen Johnson; Z00105–Z00106/SD027173–SD027174.
We need to get on this; Oct. 31, 1995; David Zinman; Z00107/SD027175.
Web site pricing draft; Nov. 7, 1995; Jason Strober; Z00108/SD027176.
Heads up . . . (fwd); Nov. 8, 1995; David Zinman; Z00109–Z00110/SD027177–SD027178.
Proposal to Intel; Nov. 13, 1995; Jason Strober; Z00111–Z00114/SD027179–SD027182.
FocaLink white paper; Nov. 13, 1995; Jason Strober; Z00115–Z00116/SD027183–SD027184.
FocaLink Media Services; Nov. 14, 1995; David Zinman; Z00117–Z00119/SD027185–SD027187.
VTraffic & Dave Carlick; Nov. 14, 1995; David Zinman; Z00120/SD027188.
FocalLink white paper; Nov. 15, 1995; David Zinman; Z00121–Z00123/SD027189–SD027191.
Re: FocalLink Meeting (fwd); Nov. 20, 1995; Karen Johnson; Z00124–Z00125/SD027192–SD027193.
Microsoft ads through FocaLink; Nov. 21, 1995; Jason Strober, Z00126/SD027194.
Re: Who's in and who's out(fwd); Nov. 21, 1995; Jason Strober; Z00127–Z00128/SD027195–SD027196.
Intel update (fwd); Nov. 23, 1995; Jason Strober; Z00129–Z00130/SD027197–SD027198.
Saturn reports; Dec. 5, 1995; Jennifer Ratner; Z00134–Z00140/SD027199–SD027205.
November Report; Dec. 5, 1995; Jennifer Ratner, Z00141–Z00146/SD027206–SD027211.
FocaLink Media Services; Dec. 6, 1995; David Zinman; Z00147/SD027212.
FocaLink Media Services; Dec. 6, 1995; David Zinman; Z00148/SD027213.
FocaLink Media Services; Dec. 6, 1995; David Zinman; Z00149/SD027214.
FocaLink for the Layman; Dec. 6, 1995; David Zinman; Z00150/SD027215.
Microtargeting; Dec. 7, 1995; David Zinman; Z00151/SD027216.
Info on FocalLink Media Services; Dec. 11, 1995; David Zinman; Z00152–Z00154/SD027217–SD027219.
FocaLink Media Services; Dec. 11, 1995; David Zinman; Z00155–Z00156/SD027220–SD027221.
Catch–up time; Dec. 11, 1995; David Zinman; Z00157/SD027222.
Info on FocaLink; Dec. 13, 1995; David Zinman; Z00158–Z00160/SD027223–SD027225.
Intel Ad on Dilbert Site; Dec. 13, 1995; David Zinman; Z00161/SD027226.
Re: Intel Ad on Dilbert Site; Dec. 13, 1995; David Zinman; Z00162/SD027227.
FocaLink Beta Test on SmartBanner; Dec. 14, 1995; David Zinman; Z00163/SD027228.
I/Pro Mtg Today; Dec. 19, 1995; David Zinman; Z00164/SD027229.
Eric Smith Quote (fwd); Jan. 10, 1996; David Zinman; Z00165/SD027230.
FocaLink Communications, Inc.; Jan. 10, 1996; David Zinman; Z00166/SD027231.
Re: Advertisers for wyp.net; Jan. 12, 1996; David Zinman; Z00167/SD027232.
Quote for Press Release; Jan. 15, 1996; David Zinman; Z00168/SD027233.
Re: Quote for Press Release; Jan. 16, 1996; "thomas mark"; Z00169/SD027234.
Re: Quote for Press Release (fwd); Jan. 16, 1996; David Zinman; Z00170–Z00171/SD027235–SD027236.
Re>** Ad Placement Notific; Jan. 19, 1996; Dan__Stoller@anisf.com; Z00172–Z00173/SD027237–SD027238.
Invitation; Jan. 25, 1996; wilkins@eit.com; Z00174/SD027239.
Focalink; Jan. 25, 1996; David Zinman; Z00175/SD027240.
SmartBanner Reports; Jan. 25, 1996; David Zinman; Z00176/SD027241.
RE: Focalink; Jan. 28, 1996; Rick Vorhaus; Z00177/SD027242.
Comments; Jan. 29, 1996; David Zinman; Z00178–Z00182/SD027243–SD027247.
Poppe Tyson/Internet Advertising Network Alliance; Feb. 26, 1996; Ron Dovas; Z00183/SD27248.
fyi; Feb. 5, 1996; "Roger Follis"; Z00184–Z00185/SD027249–SD027250.
Focalink Communications; Feb. 5, 1996; David Zinman; Z00186–Z00188/SD027251–SD027253.
Microsoft Update; Feb. 5, 1996; Margaret Bond; Z00189/SD027254.
Focalink Communications; Feb. 6, 1996; David Zinman; Z00190–Z00192/SD027255–SD027257.
Focalink Communications; Feb. 6, 1996; David Zinman; Z00193–Z00195/SD027258–SD027260.
Focalink Communications; Feb. 6, 1996; David Zinman; Z00196–Z00198/SD027261–SD027263.
[Fwd: Re: DoubleClick and IAN]; Feb. 6, 1996; Jason Strober; Z00199/SD027264.
Focalink Communications; Feb. 6, 1996; David Zinman; Z00200–Z00202/SD027265–SD027267.
Test With Focalink; Feb. 7, 1998; David Zinman; Z00203/SD027268.
Urgent—Microsoft Ad Placement; Feb. 7, 1996; David Zinman; Z00204/SD027269.
Test for Microsoft Banner; Feb. 8, 1996; Joel Bassuk; Z00205/SD027270.
ZDNet Test; Margaret Bond; Feb. 8, 1996; Z00206/SD027271.
URLs; Feb. 8, 1996; Dan Stoller; Z00207–Z00208/SD027272–SD027273.
Heads Up Feb. 9, 1996 (20 stories)<CD58M101>; An Information Service of Individual Inc.; Z00209–Z00212/SD027274–SD027277.
Focalink Communications; Feb. 13, 1996; David Zinman; Z00213/SD027278.
Targeting; Feb. 13, 1996; Michael Wang; Z00214/SD02729.
Re: Cookies!; Feb. 15, 1996; David Zinman; Z00215/SD027280.

Focalink; Feb. 22, 1996; Jason Strober; Z00216/SD027281.

Focalink/Microsoft I.E.; Feb. 23, 1996; Margee Bond; Z00217–Z00218/SD027282–SD027283.

Cookies; Mar. 6, 1996; David Zinman; Z00219/SD027284.

Did I send this 2x; Apr. 3, 1996; Z00220–Z00222/SD027285–SD027287.

Answer to your request; Apr. 8, 1996; Z00223/SD027288.

Site Letter; Apr. 10, 1996; Z00224–Z00225/SD027289–SD027290.

Oracle and Intel; Apr. 12, 1996: Z00226/SD027291.

Doubleclick; Apr. 16, 1996; Z00227/SD027292.

Open Market Licenses With NetGravity; May 6, 1996; Z00228/SD027293.

Fact check; May 12, 1996; Z00229/SD027294.

IDG; May 17, 1996; Z00230–Z00231/SD027295–SD027296.

Daily Spectrum; May 20, 1996; Z00232–Z00242/SD027297–SD027307.

Fact check; May 20, 1996; Z00243/SD027308.

Cookie FAQ; May 21, 1996; Z00244/SD027309.

Focalink Communications; May 21, 1996; Z00245–Z00246/SD027310–SD027311.

Network World Fusion; May 22, 1996; Z00247/SD027312.

Looming issue; Jul. 13, 1996; Z00248–Z00249/SD027313–SD027314.

Cookies & Privacy ?/German Press; Jul. 15, 1996; Z00205/SD027315.

Cookies & Privacy ?/German Press; Jul. 16, 1996; Z00251/SD027316.

Doubleclick; Sep. 5, 1996; Z00252–Z00253/SD027317–SD027318.

Infoseek Business Terms; Sep. 7, 1996; Z00254–Z00256/SD027319–SD027321.

SmartBanner ads on HotWired; Sep. 11, 1996; Z00257/SD027322.

Statement of Work; Sep. 23, 1996; Z00258–Z00259/SD027323–SD027324.

NetGravity Releases Adserver 2.0; Oct. 21, 1996; Z00260–Z00263/SD027325–SD027328.

"Focalink"; DC004278A.

"FocaLink Services"; FocaLink Media Services, Inc.; DC004278B–DC004278C.

"Welcome to Focalink!"; Focalink Communications; DC004278D–DC004278CC.

"Welcome to Focalink!"; Focalink Communications; DC004278DD–DC004278XX.

"*Link Marketing*"; handwritten page; MA0001.

"Link Marketing"; LinkMarket; MA0002–MA0007.

"Link Market"; David Zinman et al.; MA0008–MA0027.

"Link Marketing, LLP"; MA0028–MA0029.

"Link Marketing, LLP"; MA0030–MA0038.

"Escapes"; Web page; MA0039–MA0040.

"Industry Overview"; FocaLink Media Services, Inc.; MA0041–MA0053.

"Executive Summary"; Focalink Communications Confidential; printed Jul. 30, 1997; MA0054–MA0109.

"Focalink Communcations"; Feb. 1996; MA0110–MA0149.

* cited by examiner

METHOD AND APPARATUS FOR AUTOMATIC PLACEMENT OF ADVERTISING

Applicants hereby claim the benefit of priority of U.S. provisional patent application Ser. No. 60/048,940, filed Jun. 16, 1997 and U.S. provisional patent application Ser. No. 60/049,877 filed Jun. 17, 1997.

FIELD OF THE INVENTION

This invention relates to computer systems for automated replacement of advertisements in scarce media. In particular, the present invention relates to the automated selection of direct advertising in advertising campaigns in order to utilize scarce media space efficiently and optimize revenue.

BACKGROUND OF THE INVENTION

Scarce media is defined as media providing limited amount of space. For example, newspaper and magazines have limited amount of page space; radio and television have a limited amount of air time slots; Internet web pages have limited amount of viewable screen space and/or bandwidth; and so on. Media providers (such as magazines and newspaper publishers, radio and television broadcasters, Internet content providers and advertising networks) commonly bill advertisers based on two prevalent pricing models.

The first pricing model, based on the number of impressions delivered, is often referred to as "CPM" pricing (i.e. cost per thousand impressions). In CPM pricing, an advertiser pays a media provider a fixed amount based on the circulation of their advertisement, regardless of whether the advertising campaign is successful.

The second pricing model, based on explicit customer feedback, is sometimes referred to as "Direct Response" or "CPA" advertising (i.e. cost per actions). CPA pricing is distinguished from CPM pricing, because in CPA pricing, a marketer compensates a media provider a variable amount based on the success of the advertising campaign. Successful ad campaigns are measured, for example, by the number of survey forms filled out, leads generated, sales transacted, software downloaded, and so on.

Whereas in CPM pricing, an advertiser is entirely at risk for an unsuccessful advertising campaign, in the case of CPA pricing, the risk of an ad campaign's success is placed wholly on the media provider. It is therefore an important objective of media providers to select successful direct advertising campaigns in order to utilize scarce media space efficiently and optimize revenue.

A significant economic problem exists for media providers billing on CPA models, wherein two or more direct advertisers wish to advertise on the same scarce space and only one can be accommodated. The media provides would normally prefer to allocate its space to direct advertisers so as to maximize revenue. A revenue maximizing strategy dictates that media providers allocate space to the most successful direct advertising campaign, however, successful campaigns are not known on a pro forma basis. Consequently, media providers are currently burdened with the task of estimating the performance of direct advertising campaigns. Selection of direct advertising, which is currently done in an ad hoc fashion, is usually a manual process.

Further, current media allocations do not make reference to, or precisely measure, the "context" in which each direct advertisement performs best. Context is defined as the particular user to which the Advertisement is shown; and/or the particular date and/or time during which the Advertisement is displayed; and/or the particular "Division of Media" (a term defined below) in which the Advertisement is placed. Current selection of direct response advertising for CPA models is therefore highly inefficient and prone to error, often resulting in sub-optimal allocations of scarce media. Poorly performing direct advertisements represent a cost of opportunity and therefore an economic loss for the media provider. Conversely, better performing direct advertisements would generate more revenue and make better use of scarce media space.

In summary, there is an important need for a method and apparatus for improved selection of direct response advertisements and more efficient utilization of scarce media in direct response advertising.

SUMMARY OF THE INVENTION

The present invention provides a method and apparatus for efficient utilization of direct advertising space in scarce media. An advertising server (also referred to herein as an advertisement server) selects a direct advertisement, based on certain criteria, for automatic replacement in scarce media. Transaction results of the direct advertisement placement are reported back to the advertising server. In one embodiment, the direct advertiser's server reports transactions back to the advertising server by email. In a second embodiment, a direct proxy server mirrors the direct advertiser's server, including transaction processing. The direct proxy server reports the results of transactions back to the advertising server (and associated accounting system) without requiring an email program modification of the remote direct advertiser's web site. The use of a direct proxy for reporting transactions provides an independent audit of transactions at the remote direct advertiser's web site. In either embodiment the feedback of the results of direct advertisement transactions is used to provide an efficient utilization of direct advertising space by way of an automated computer system with a predictive model.

As used herein, the terms "advertising server" and "advertisement server" are used interchangeably to refer to a server that selects an advertisement for display to a user. The invention is embodied in an automated computer system with a predictive model that has any and/or all of the following process functionality:
1. Estimating the performance of particular direct advertisements using a predictive model
2. Selecting a direct advertisement or group of Advertisements that are estimated to perform optimally from a pool of direct advertisements
3. Delivering the selected direct advertisements to a medium (e.g. a web page or a newspaper)
4. Monitoring a feedback loop to determine if the user responded to the direct advertisement
5. Updating the predictive model based on the user's response
6. Calculating the actual performance of a particular Direct Response Advertisement after a statistically significant sampling period of user responses
7. Replacing poorly performing advertisements with those estimated to perform better
8. Repeating steps 1 to 7 above in an iterative process so that the media provider has exploited scarce media in an optimal manner
9. Providing reports and usage patterns to the advertiser and the media provider The present invention provides a method and apparatus for media providers to correlate particular advertisements with particular divisions of media space, so the media provider can further optimize scarce media space. Divisions of media space are, for example, individual pages of web sites; time slots for TV and radio commercials; sections of magazines and newspapers; and so on.

The present invention provides a method and apparatus for media providers to correlate particular advertisements direct with particular users and groups of users of media, so the media provider can further optimize scarce media space. Users of media are, for example, browsers of web sites; viewers of television and CATV; listeners of radio; readers of magazines and newspapers; and so on).

The present invention provides a method and apparatus for the automatic prevention of ad "burn out." Burn out is defined as the circumstance in which a viewer sees a particular advertisement, or a type of advertisement, too many times and is thereby desensitized to it, making it unlikely that he or she will respond. The same functionality for ad selection and targeting, as described in this invention disclosure, also alleviates user burn out.

It is also an object of the present invention to provide a method and apparatus for the dynamic replacement of advertisements according to context (defined above). For example, advertisements for Christmas trees have been historically shown to perform well from late-November until December 24, whereas the same advertisements perform poorly other times of the year. The same functionality for ad selection and targeting, as described in this invention disclosure, also dynamically allocates advertisements according to Context. In this example, the media allocation based upon Context of a date would cause more Christmas tree advertisements to run from late-November until Christmas Eve, and then the system will shut off such ads. While the solution in foregoing simple example would normally be evident to a manual operator, the important feature is that in the present invention, the dynamic media allocation is automatic and does not require manual intervention. Other more subtle contexts, for which the present invention can dynamically allocate media include, but are not limited to, particular Users and Divisions of Media.

While the preferred embodiment of this invention operates on an Internet advertising network, the invention is broadly applicable across any advertising system involving scarce media and customer feedback. Applicable advertising systems include, but are not limited to, direct mail, telemarketing, television, radio, print, and CATV, etc.

DETAILED DESCRIPTION OF THE PREFERRED EMBODIMENTS

Figure 1:
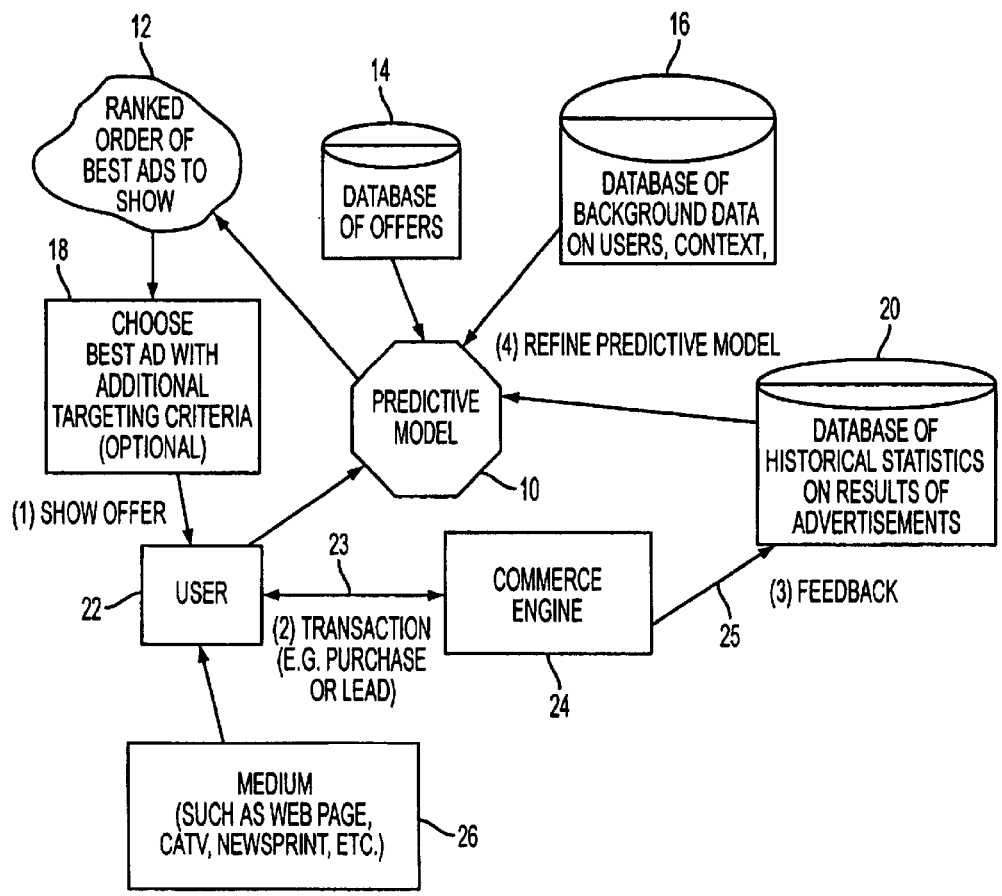
FIG. 1 is a block diagram of a system for automatic placement of direct advertisements in accordance with the present invention.

FIG. 1 is an architectural diagram of the present invention. A predictive model 10, run on a server is shown having inputs including a database of direct advertisements 14 ("Offers" in the diagram), context 16 (i.e. "Database of background Data on Users, Divisions of Media Advertisers, and other Context), Database of Historical Results of Direct Advertisements Advertisers 20, as well as information on a particular user 22 to be served an advertisement. The predictive model 10 processes all of the foregoing inputs and outputs a single direct advertisement, or a ranked order of direct advertisements 12, to which the user is most likely to respond. The predictive model's suggestion is optionally filtered 18 by additional criteria (for example, "is the advertiser's account in good standing?" "Has the media provider blocked a particular advertisement?"etc.).

The direct advertisement 18 that is selected is dynamically delivered through a medium 26 to the user for him or her to view through a web browser. The user may then interact with the direct advertisement by means of a feedback loop 23 to a commerce engine 24 (a commerce engine is hereby defined as any electronic or physical infrastructure that facilitates a transaction). For example, Internet forms, fax-back systems, toll-free numbers, direct mail postcards, interactive television buttons, etc. are all types of commerce engines 24 in that they each enable users to respond explicitly to a direct response advertisement. Transactions are hereby defined any form of explicit feedback which a user may convey by means of a commerce engine. For example, filling out a form, placing an order, supplying a credit card number, completing a survey, providing a survey or lead form, executing a software download, etc. are all forms of transactions.

FIG. 1 also shows feedback 25 from the commerce engine 24 to the database of historical results on advertisements 20, Users, and Context. This feedback may include detailed information about a particular user's response to a direct advertisement, as well as the context, under which the response was obtained. Alternatively, the feedback loop may include a subset of the preceding information. Or the feedback loop may convey information that the user did not respond to the advertisement, if such was the case. The feedback information is used by the predictive model 10 to further refine future predictions about the optimal advertisements to deliver and maximal utilization of scarce media space.

Figure 2:
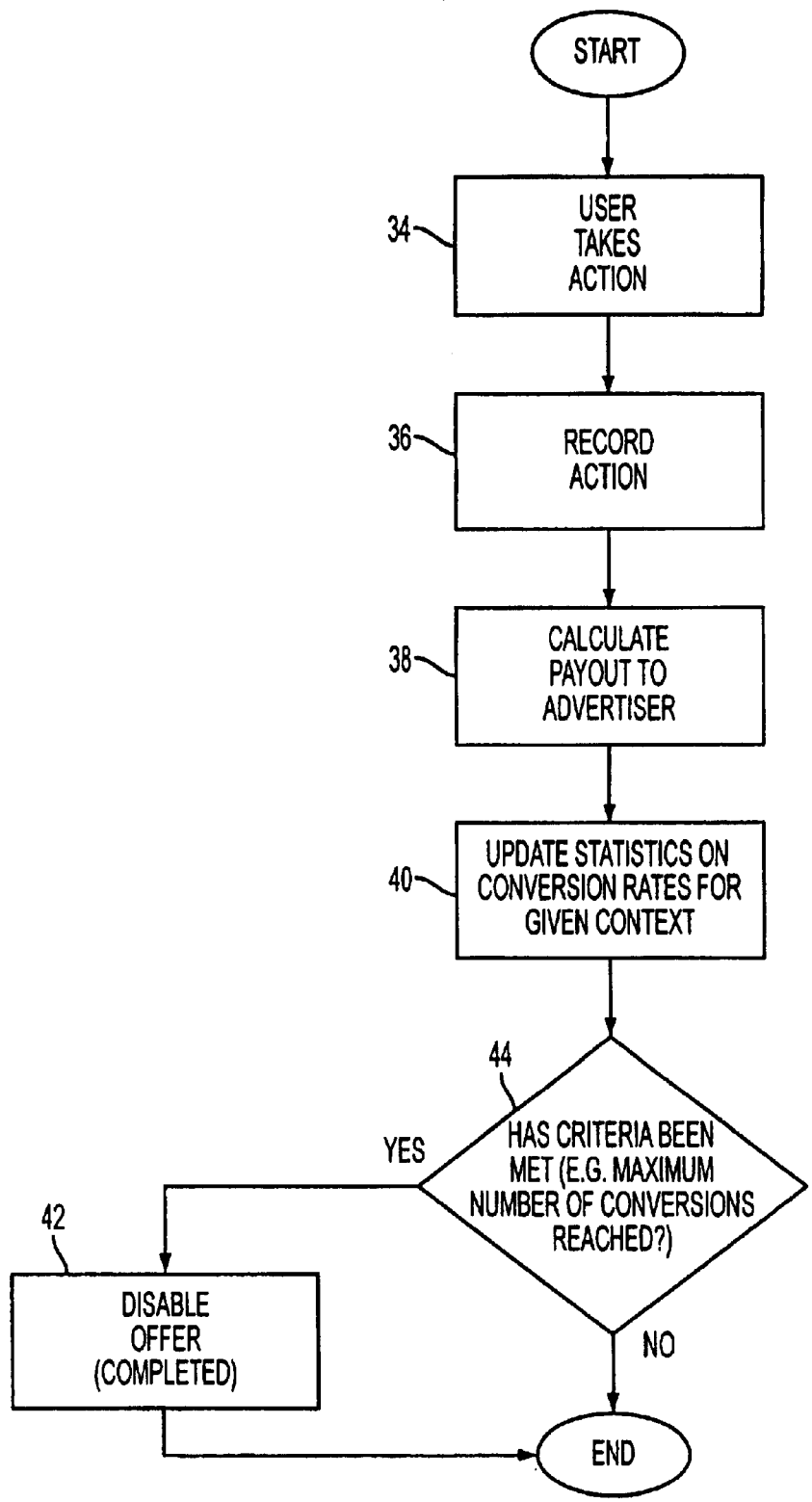
FIG. 2 is a flow chart diagram of the process for processing feedback transaction data for managing the placement of direct advertisements in accordance with the present invention.

FIG. 2 illustrates the process by which a user performs a transaction with a commerce engine and through the feedback loop, reports back to the predictive model. After the user takes an action 34 and the revenue to the advertiser is calculated 38 (i.e. the "payout"), the database monitoring ad delivery is automatically updated 36, 40. If the particular direct advertisement exceeds a pre-set limit 44, (for example, the maximum number of conversions for the ad, for the user, for the time period, etc.) further distribution of the advertisement is disabled 42. A conversion is a successful transaction, which depending upon the context may be any one of a sale, a click through, an order, a download, etc. The feedback process enables the predictive model, as described in more detail below, to work in conjunction with manual pre-sets on direct advertising campaigns.

The preferred embodiment of the present invention is implemented on an Internet advertising network, in which the media providers are Internet Web sites and the direct advertisers employ banner advertisements appearing for example on web pages to promote their products and services.

Both the advertisement and predictive model servers are programmed database systems running on top of Windows NT. The advertisement servers contain a database of the information necessary to generate the various banner or other types of advertisements that may appear on a web page. Each advertisement is assigned a unique address and is selected based upon the various criteria for the predictive model.

Advertising management, accounting, and monitoring are also custom-programmed systems, which are accessed through the same NT-based computer network. Database information for the predictive model, users, and context is stored on an external programmed database, which is preferably accessed through an Oracle database or other SQL database.

The predictive model is programmed and currently makes use of the following context information that may be associated for example with the Internet: user id (TCP/IP address for example), ad id (which may be arbitrarily assigned), page id (such as a World Wide Web page), site id (such as a World Wide Web site), time of day (either at the site of the computer running the predictive model or the time based on the TCP/IP address), day of the week, and date. Techniques for identifying the user ID are described in U.S. patent application Ser. No. 08/738,634 filed on Oct. 29, 1996, pages 8, line 2 through page 9, line 10 of which are incorporated by reference. The predictive model has an extendible architecture to make use of additional context information as well.

Empirically measured data and/or initial suppositions about each advertisement are used to initially establish the predictive model to assign weights for different advertisements. For example, the time of advertisements are more favorably run may depend upon seasonal factors such as advertisements for summer clothing being more heavily favored in late spring and early summer. Similarly, the predictive model may also assign different weights to different locations where the user is located. For example, advertisements for gardening tools may be more heavily weighted when the user is viewing a page connected to gardening or home improvement and less heavily weighted towards selection when the user is viewing a page regarding for example fashions. Similarly, the time of day, the frequency of display to either all users or a given user, or any other factor such as those discussed at page 13, line 15 through page 14, line 2 of the above reference application. The predictive model may also be modified by examining the results of the CPA to maximize revenue by, for example, searching for advertisements that seem to be outperforming other advertisements in the same category of goods or services.

The advertisement servers deliver stored, targeted direct advertisements to users based on the recommendation of the predictive model as well as additional advertisement selection information that is manually configured through the advertisement management system. The various servers for the prediction models, the advertisement servers, the commerce engines, may be in located in one physical location and connected over a LAN or they may be located in various locations and communicating over a WAN or the Internet.

Figure 3:
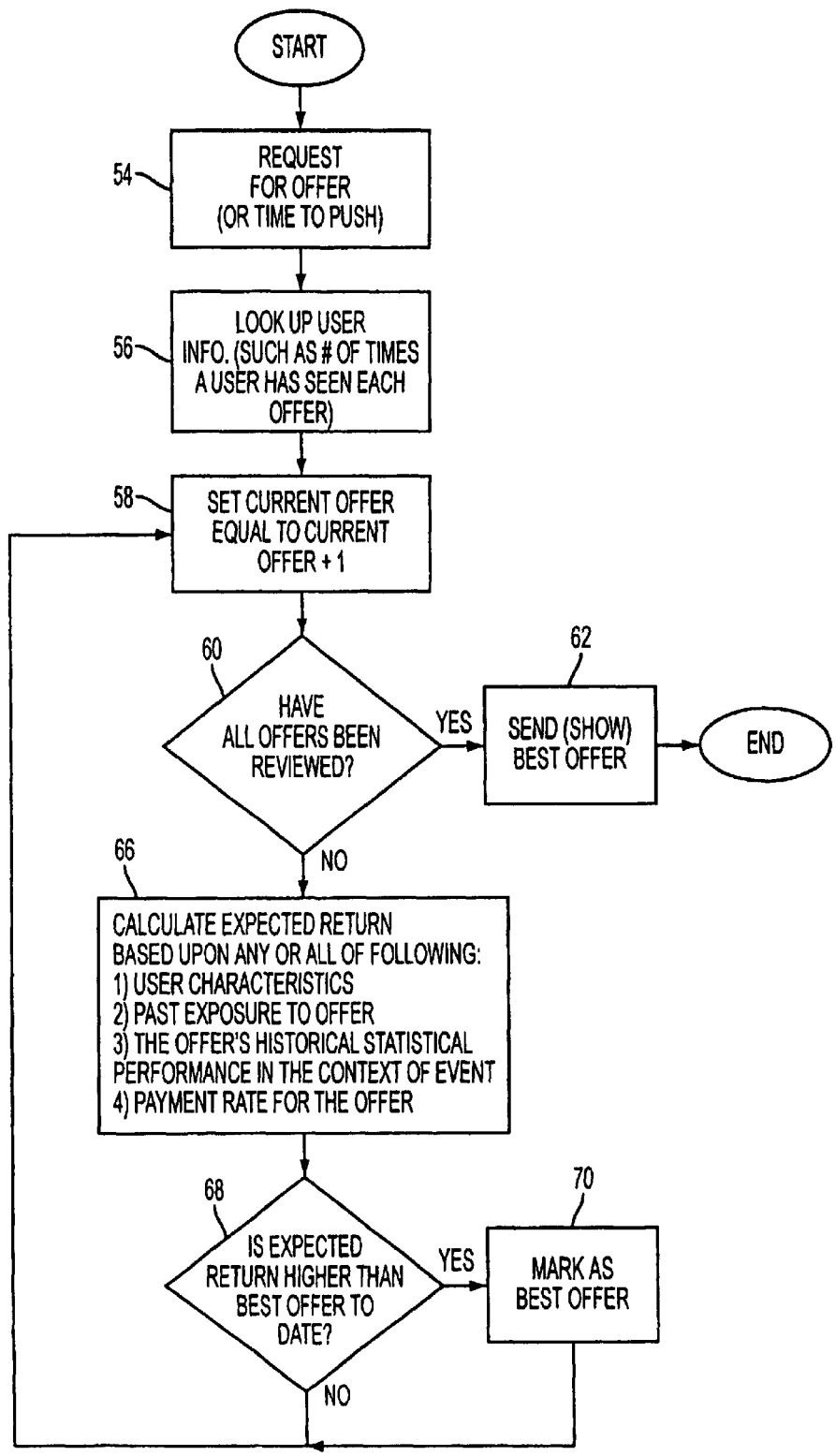
FIG. 3 is a flow chart diagram for selecting a direct advertisement based on various criteria in accordance with the present invention.

FIG. 3 displays the process by which the predictive model selects advertisements. In the process flow chart of FIG. 3, a direct advertisement is selected based on various criteria. The advertisements in this case are "offers", such as direct ads for sales of goods or services, but can also be offers to fill out survey forms, generate leads, download software, and the like. In particular, after a request for a direct advertisement offer 54 is received, user information is looked up at step 56. User information may for example, consist of the number of times the user has seen each offer.

Each of the current offers is reviewed by calculating the expected return at step 66. Some of the decisions that the predictive model bases its advertisement selection include user characteristics, past exposure to the advertisement, historical statistical performance in the context of the user and the event; and/or the payment rate for the offer. Considering all the factors known about the user, the offer, the probability of conversion and the cost per action, the expected return for the offer is calculated. If the expected return is higher than previously rated offers at step 68, the offer is marked as the best offer at step 70. The current offer counter is incremented at step 58, and the next offer is reviewed at steps 66, 68 and 70. When all offers have been reviewed, at step 60, the best offer is sent and shown to the user at step 62.

The flow chart of FIG. 3 is also applicable for media content that the user requests (i.e. "pulled" content) as well as that which is broadcast to him or her (i.e. "pushed" content).

Users view Direct Advertisements as banner ads on Web Pages by using a browser such as Netscape or Internet Explorer. Direct Transactions are initiated whenever users click on these banner ads. When users click on such ads, their browsers are automatically redirected to a Commerce Server where they can complete an Action. The Commerce Server may be located at the advertiser's web site or may be co-located at the location of the advertisement servers or the predictive model server. In response to a successful action such as a sale, an e-mail message is generated back from the advertiser's web site to the predictive model server.

Actions include, for example: completing a survey, supplying lead information, providing a credit card number, executing a software download, making a purchase, viewing a slide show, playing an online computer game, etc. The Commerce Server hosts these actions and is optionally located either on the same premises as the advertisement servers or off site at another location and/or another Internet domain. In either case, Commerce Servers communicate back to the predictive model by means of an email API. A specification of the API may be as follows:

DoubleClick Direct Response Network

Marketer Interface Specification preliminary Overview This document specifies an interface for the feedback of transactions to DoubleClick for cost per action (CPA) advertising purchases.

When a transaction occurs that is the result of an advertisement with DoubleClick Direct, the advertiser notifies DoubleClick of the transaction via an automated email message procedure. On the ad click-through, the advertising server redirects the user to a URL specified by the advertiser such as a commerce server operated by the advertiser or a third party such as a virtual mall. The URL will end with an event string that contains information used by DoubleClick to account for transactions. For example:

http://www.acme.com/offer.html?<event string>

For example, the following could represent an actual click-through URL:

http://www.acme.com/
offer.html?1;3974;123;9876543;40392855;1507

The portion after the question mark is the event string. The marketer's commerce server should remember this string and keep it associated with the user (either via a session cookie or by embedding it in the URLs used during the session).

When a transaction occurs, the commerce server must send an email notification to the operator of the predictive model server using an e-mail address such as event@doubleclick.net. The body of the email has the following format, with arbitrary number of <event record> fields:

```
version:  1
account:  <domain>
passkey:  <passkey>
order:    <order name>
test:     <email>
<event record>
<event record>
```

An event record is a series of lines specifying details of the transaction. The event record always starts with an "event:" field. For example:

```
event: 1;3974;123;9876543;40392855;1507
action: sale
amount: 25
``` where the number "1" represents the version, the number "3974" is the advertisement identification to indicate which advertisement was used for the click through, the "number 123" is used for identifying the web site for where the banner was located; "9876543" identifies the particular page where on the web site where the banner is located, "40392855" represents the user's TCP/IP address or the identifier in a cookie for that particular user, and "1507" is a check sum used for verifying the other information; action indicates that a "sale" took place and the amount might indicate for example 25 dollars.

Thus, all of this information will be compiled and stored on the predictive model server's database to indicate a successful action for the particular advertisement. Further, the accounting process will track the successful action and credit (either directly or indirectly) the operator of the predictive model server's accounts.

A list of fields follows:

version: means the version number for the e-mail message and is a required field; Version should generally be 1.

account: means the site's domain name (e.g., acme.com) and is a required field.

passkey: means a password which authenticates the source of the message and is provided elsewhere in the system to provide authentication so that a malicious party cannot send false messages. This is also a required field.

order: means the name of the order as shown in the ad management server and is an optional field used if the event string is unknown to correctly assign the event information to the correct order. For example, order may be sued if there are multiple insertion orders with financial contract differences.

test: means an email address to send the test results and is optional. If the test address is specified the message will be validated and the results will be sent to the email address specified. In particular, this is used to verify message formats. Data contained in a test message is not processed.

event: means the event string passed from the DoubleClick ad server and is required. If the event string is unknown, the event is defined as unknown in the message format. Unknown event strings may result if the user has disabled cookies.

action: means the type of transaction such as a "sale", a "download", an "inquiry" or other categories and is required. If for a sale, the amount of the currency such as the total amount is included as a subfield and this subfield is required.

tran-ID: means a transaction identifier string that is optional but highly recommended to include in the message to resolve any accounting discrepancies.

Each transaction may be emailed separately, or batched and sent in a single message. Batching is recommended if transactions exceed one hundred per day, otherwise, individual emails are fine. Batches for transaction should be sent at least every 24 hours, more frequently if possible.

A sample email is shown below for three events.

```
To: event@doubleclick.net
Subject: event
Body: version: 1
account; acme.com
event: 1;3974;123;9876543;40392855;1507 action: sale
amount: 25 tran-id: K254133
event: unknown order: Acme Test Order action: sale amount:43
tran-id: K25413
event: 1;397416;9876544;11393257;1456 action: sale amount:
230.21.tran-id: K254135
```

Software run on a server that may be co-located with the predictive model software compiles monthly reports for direct advertisers and web sites. The accounting software can derive the effective CPM of direct advertising campaigns by calculating this number (CPM is a function of action price multiplied by conversion rate, both of which the system keeps track of). Custom software also allows Insertion Orders to be filled out and Sites to be added to the network. The system is highly scaleable and has an architecture that will accommodate thousands of web sites and tens-of-thousands of ads.

Direct Proxy

Figure 4:
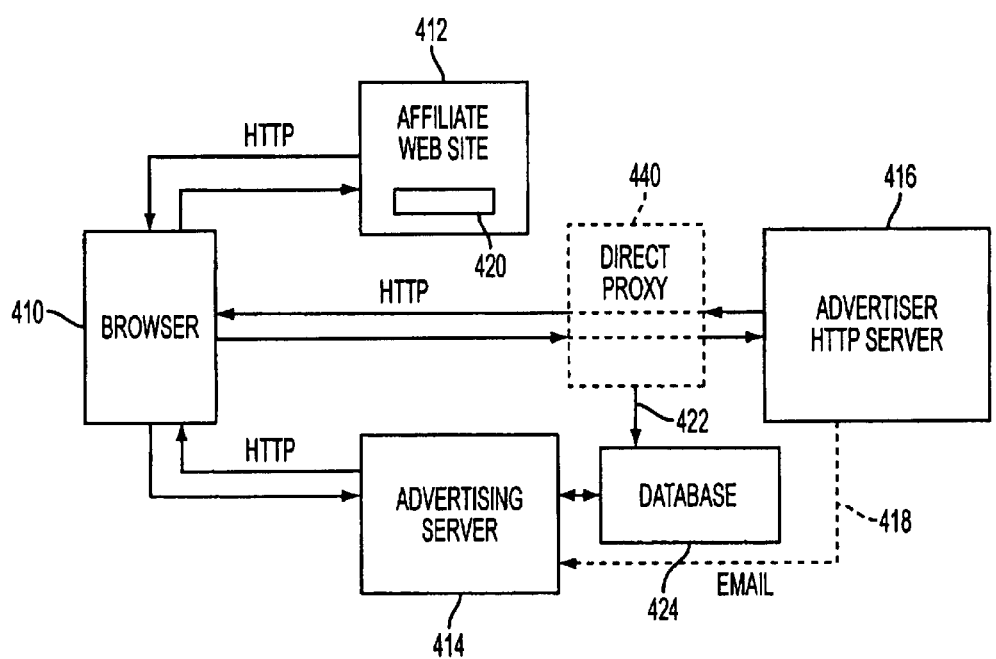
FIG. 4 is block diagram of an alternate embodiment of a system for automatic placement of direct advertisements, in accordance with the present invention.

FIG. 4 shown an alternate embodiment of the present invention shown in FIG. 1. FIG. 4 is equivalent to FIG. 1 except for the addition of a direct proxy 440. In particular, a system for the delivery of advertising over networks includes a user with a browser 410 (which is shown in FIG. 1 as user 22). The system includes at least one affiliate web site 412 (a web site as a content provider with advertising space is a specific example of a medium 26 in FIG. 1). Central to the system is an advertising server 414 (which includes the predictive model 10, and advertising selection algorithms 12, 18 in FIG. 1). The advertising server further communicates with a database 424 (equivalent to databases 14, 16, 20 in FIG. 1). Also part of the overall system is one or more direct advertiser web sites 416 (represented generally as commerce engine 24 in FIG. 1). Email return path 418 is a specific example of feedback 25 in FIG. 1, while direct proxy 440 is an alternate embodiment of feedback path 25 in FIG. 1.

The basic operation of the systems of FIGS. 1 and 4 provides for the selection of advertising targeted to the user. The systems shown are particularly useful when the targeted advertising is direct advertising, which requires a direct response (also known as a "conversion") by the user.

In operation, when a user, browsing on the Internet, accesses an affiliate's web site 412 which would typically include media content and advertising space 420, the user's browser 410 generates an http message to get the information for the desired Web page. The affiliate's web site 412 in response transmits one or more messages back containing the information to be displayed by the user's browser. In addition, the advertising server 414, using a local database 424 containing advertising and user data, provides additional information comprising one or more objects such a banner advertisement to be displayed in the advertising space 420 along with the information content provided from the affiliate web site. Upon clicking through by selecting the advertising object 420 (such as a banner), the browser 410 is connected to the direct advertiser's web site 416.

Transaction results of the direct advertisement placement are reported back to the advertising server in one of two ways. In the first embodiment, the direct advertiser's server 416 reports transactions back to the advertising server by email 418. In a second embodiment, a direct proxy server 440 mirrors the direct advertiser's server 416, including transaction processing, and the direct proxy server 440 reports the results 422 of transactions back to the advertising server 414 and database 424. The direct proxy server 440 brokers the user's session (or interaction) with the direct advertiser's server 416, and reports back 422 to an accounting system (not shown) associated with the advertising server 414.

Figure 5:
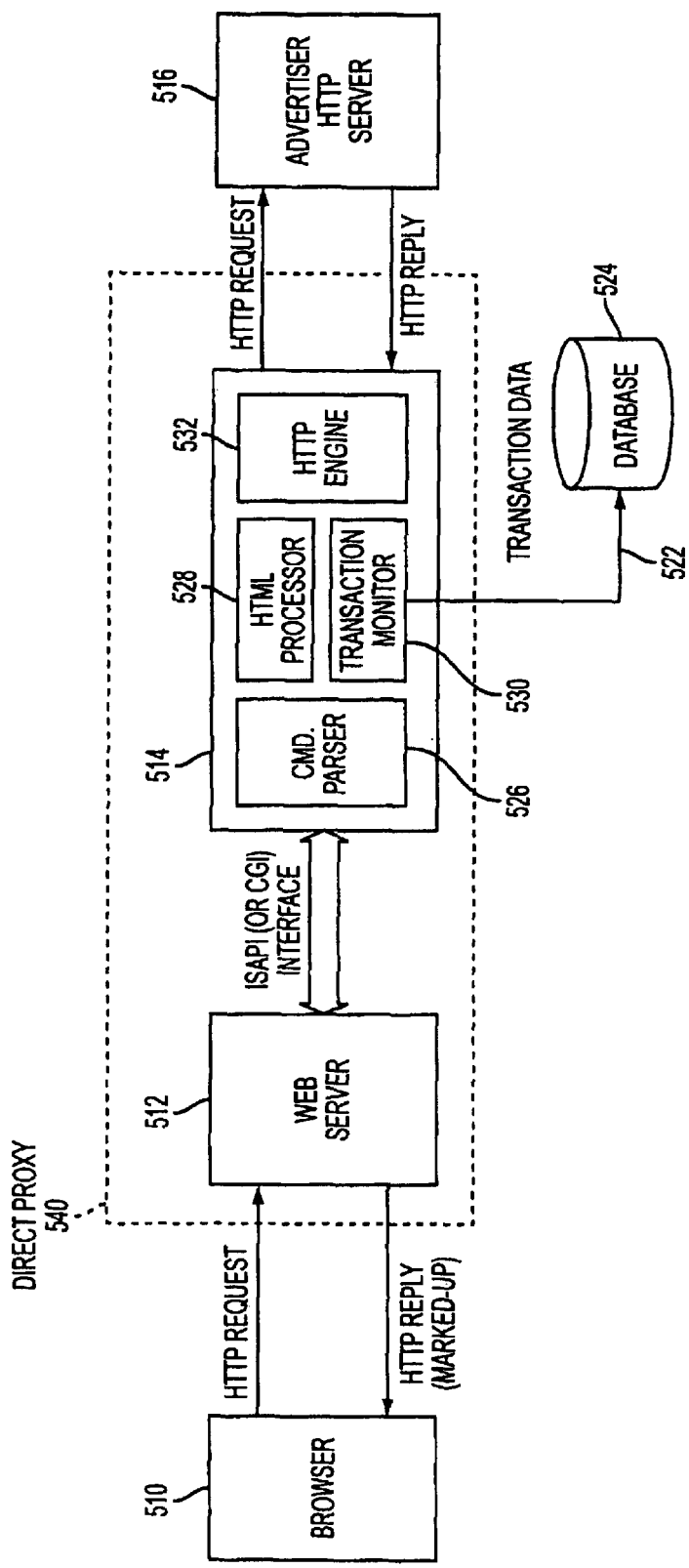
FIG. 5 is a block diagram of a direct proxy server for use in conjunction with the present invention.

The direct proxy 440 is illustrated in further detail in FIG. 5. Direct proxy 540 is a process that provides a mechanism for transparently monitoring activity between an end user's Web browser 510 and an online marketer's Web site 516. The direct proxy 540 detects 522 and records 524 the successful completion of end user transactions at a remote Web site. The direct proxy 540 supports transactions including the completion of data entry forms, initiation of software downloads, and electronic sales of products or services. Because of its flexible methodology, additional types of transactions can be supported.

The direct proxy server 540 operates as follows:
1. A Web server 512 interface to the World Wide Web using the HTTP protocol, and provides a common industry standard interface such as ISAPI (Internet Server Application Programming Interface) or CGI (Common Gateway Interface). The command parser 514 is a command interpreter that breaks up received URL strings for separate action with direct proxy 540. A proxied session is started by a command received at the command parser 514. The command that begins a proxied session has associated parameters that select specific configuration information for that session. One of the associated parameters is a Uniform Resource Locator (URL) of a Web site 516 that to be proxied.
2. The direct proxy 540 fetches (from advertiser web site 516) the document specified by the supplied URL using the HyperText Transfer Protocol (HTTP) generated by the HTTP engine 532.
3. A transaction monitor 530 to look for a pre-configured data pattern in the retrieved document scans the retrieved document. The pre-configured data pattern is derived from predetermined knowledge of the type of transactions to be performed by the direct advertiser's web server 516. If the pre-configured data pattern is detected, a conversion is deemed to have been completed successfully, and the conversion (a transaction) is recorded in a database 524.
4. The retrieved document is passed through an HTML processor 528, which is a filter process that examines most of the URLs in the retrieved document. The HTML processor 528 modifies or re-assigns URLs so that remote entities are directed back to the direct proxy 540. If the URL matches a set of pre-configured patterns, that URL is modified so that the new URL now contains a direct proxy command referring back to the direct proxy's own Web server 512, with the original URL as a parameter to the command. Thus, each URL is effectively re-addressed in such a way that when a user clicks on a hyperlink anchored by the re-addressed URL, the user's browser will be directed back to the direct proxy 540 Web server 512.
5. Steps 2 through 4 are repeated for each subsequent HTTP document request, received by the direct proxy 540, from the user's browser. A proxied session logically ends when the user clicks on a hyperlink that has not been re-addressed by the direct proxy 540 HTML processor 528.

The direct proxy 540 also contains several features designed to improve performance and transparency in the proxying process:

Web document caching. Each requested document is cached by the direct proxy 540 so that if a document has not changed since the last request, the direct proxy 540 will use the local copy in the cache, rather than re-fetching the document from the remote server.

Exclusion of binary data. The direct proxy does not re-address URLs in the HTML source that refer to binary data, such as graphic images, Java applets, ActiveX controls, and the like. Binary objects are requested directly by the user's browser, and thus proxy bandwidth is not consumed with handling large objects (whose content is typically irrelevant to the proxy process anyway).

Cookie handling. The direct proxy will manage cookies issued by the remote server without passing these cookies back to the user's browser. This permits the cookie-based Web applications to function successfully even if the user has cookies disabled in their browser.

As indicated above, there are two alternate embodiments of the feedback path 25 in FIG. 1 by which transactions at a remote direct advertiser site are reported. FIG. 4 illustrates both embodiments. The first embodiment is by email feedback 418, while the second embodiment is via a direct proxy 440. The use of email to provide feedback of transactions requires that the remote web site be modified to contain the email program.

Although equivalent in end results, a direct proxy 440 report has a special advantage over an email 418 report. In the case of an email report 418, the correct reporting of remote transactions is dependent on correct functioning of the email API in the remote advertiser's web site. In the case of a direct proxy report, transaction reporting is independent of the functions at the remote advertiser's web site. In such manner the use of a direct proxy 440 provides an independent audit of transactions at the remote direct advertiser's web site 416. Independent verification of transactions at a remote web site assures reporting compliance and improves the reliability of the historical data relating to conversion rate.

What is claimed is:
1. A method for advertisement selection, comprising:
   (a) receiving from an advertiser Web site feedback representing user transactions at the advertiser Web site, the user transactions resulting from user response to at least one of a plurality of direct advertisements;
   (b) receiving a request to display a direct advertisement to a user; and
   (c) selecting, in response to the request, one of the plurality of direct advertisements for display based at least in part upon the advertiser feedback.
2. The method of claim 1, further comprising compiling from the advertiser feedback a historical statistical conversion rate for each of the at least one of a plurality of direct advertisements, and wherein the selection of one of the plurality of direct advertisements is based at least in part upon its historical statistical conversion rate.

3. The method of claim 1, wherein user transactions include at least one of a sale, an order, a download and a click through.

4. The method of claim 1, wherein the advertiser feedback is received via e-mail.

5. The method of claim 1, wherein the advertiser feedback is received via a direct proxy server.

6. A computer system for advertisement selection, comprising:
- a storage device configured to store a plurality of direct advertisements;
- a communications device configured to communicate with an advertiser Web site and a user; and
- an advertisement server configured to receive from the advertiser Web site via the communications device feedback representing user transactions at the advertiser Web site, the user transactions resulting from user response to at least one of the plurality of direct advertisements, the advertisement server further configured to receive from the user via the communications device a request to display a direct advertisement, the advertisement server further configured to select, in response to the user request, one of the plurality of direct advertisements for delivery from the storage device to the user based at least in part upon the advertiser feedback.

7. The system of claim 6, wherein the advertisement server is further configured to compile from the advertiser feedback a historical statistical conversion rate for each of the at least one of the plurality of direct advertisements, and wherein the selection of one of the plurality of direct advertisements is based at least in part upon its historical statistical conversion rate.

8. The system of claim 6, wherein user transactions include at least one of a sale, an order, a download and a click through.

9. The system of claim 6, wherein the advertisement server is further configured to receive the advertiser feedback via e-mail.

10. The system of claim 6, wherein the advertisement server is further configured to receive the advertiser feedback via a direct proxy server.

11. A machine-readable medium storing instructions adapted to be executed by a processor to:
- (a) receive from an advertiser Web site feedback representing user transactions at the advertiser Web site, the user transactions resulting from user response to at least one of a plurality of direct advertisements;
- (b) receive a request to display a direct advertisement to a user; and
- (c) select, in response to the request, one of the plurality of direct advertisements for display based at least in part upon the advertiser feedback.

12. The medium of claim 11, further comprising instructions to compile from the advertiser feedback a historical statistical conversion rate for each of the at least one of a plurality of direct advertisements, and wherein the selection of one of the plurality of direct advertisements is based at least in part upon its historical statistical conversion rate.

13. The medium of claim 11, wherein user transactions include at least one of a sale, an order, a download and a click through.

14. The medium of claim 11, wherein the advertiser feedback is received via e-mail.

15. The medium of claim 11, wherein the advertiser feedback is received via a direct proxy server.

* * * * *